United States Patent
Morisaki et al.

[11] Patent Number: 5,906,738
[45] Date of Patent: May 25, 1999

[54] APPARATUS AND METHOD FOR REMOVING IMPURITIES FROM AQUEOUS HYDROGEN PEROXIDE

[75] Inventors: Akira Morisaki; Yasuyoshi Sawaguri; Yoji Matsuda, all of Chiba, Japan

[73] Assignee: Sumitomo Chemical Company, Ltd., Osaka, Japan

[21] Appl. No.: 08/321,612

[22] Filed: Oct. 12, 1994

[30] Foreign Application Priority Data

Oct. 12, 1993 [JP] Japan ............................. 5-254014

[51] Int. Cl.⁶ ............................. B01D 63/00; B01D 61/00
[52] U.S. Cl. ............................. 210/257.2; 210/259; 210/195.2; 210/263
[58] Field of Search ............................. 210/259, 652, 210/257.2, 654, 638, 195.2, 263

[56] References Cited

U.S. PATENT DOCUMENTS

| | | | |
|---|---|---|---|
| 3,387,938 | 6/1968 | Leaver | 210/207 |
| 4,778,532 | 10/1988 | McConnell et al. | 210/739 X |
| 4,879,043 | 11/1989 | Boughton et al. | |
| 4,985,118 | 1/1991 | Kurematsu et al. | 159/47.3 |
| 5,215,665 | 6/1993 | Crofts et al. | 210/638 |
| 5,262,058 | 11/1993 | Morris et al. | 210/663 |

*Primary Examiner*—Ana Fortuna
*Attorney, Agent, or Firm*—Birch, Stewart, Kolasch and Birch, LLP

[57] ABSTRACT

Impurities are removed from aqueous hydrogen peroxide by treating the aqueous hydrogen peroxide by reverse osmosis, cation-exchanging the aqueous hydrogen peroxide and anion-exchanging the aqueous hydrogen peroxide, and the treated ultra-pure hydrogen peroxide can be used in the electronics industries.

9 Claims, 2 Drawing Sheets

5,906,738

APPARATUS AND METHOD FOR REMOVING IMPURITIES FROM AQUEOUS HYDROGEN PEROXIDE

BACKGROUND OF THE INVENTION

1. Field of the Invention

The present invention relates to an apparatus and a method for removing impurities from aqueous hydrogen peroxide to produce ultra-pure aqueous hydrogen peroxide which is used, in particular, in the electronics industry.

2. Description of the Related Art

Aqueous hydrogen peroxide is used in the electronics industry, for example, for cleaning silicon wafers and the like.

Aqueous hydrogen peroxide which is produced industrially is contaminated by various impurities such as substances originating from metals, for example, iron, aluminum, sodium, calcium, lithium, zinc, lead, chromium, nickel, magnesium, etc., or organic materials originating from various additives, phosphorus, and the like during production, storage, transportation, and so on.

However, since the contamination of aqueous hydrogen peroxide with such metal-originated substances or organic materials has much influence when used in the electronics industry, on the deterioration of the quality of the products, i.e., the silicon wafers, it is essential to remove such impurities.

In recent years, with the advance in precision of electronics such as increase of an integration degree of an IC, the requirement for the removal of impurities has become more stringent. Many proposals have been made on the removal of the impurities such as the metal-originated substances or the organic materials, but none of them reaches a satisfactory level.

SUMMARY OF THE INVENTION

One object of the present invention is to provide an apparatus for effectively removing impurities, in particular, the metal-originated substances and the organic materials from aqueous hydrogen peroxide.

Another object of the present invention is to provide a method for effectively removing impurities, in particular, the metal-originated substances and the organic materials from aqueous hydrogen peroxide.

According to a first aspect of the present invention, there is provided an apparatus for removing impurities from aqueous hydrogen peroxide, comprising a section for introducing aqueous hydrogen peroxide in a main line, a main line which comprises a section for reverse osmosis treatment, a cation-exchange equipment and an anion-exchange equipment, and a section for discharging treated aqueous hydrogen peroxide from said main line.

According to a second aspect of the present invention, there is provided a method for removing impurities from aqueous hydrogen peroxide comprising steps of treating said aqueous hydrogen peroxide by reverse osmosis, cation-exchanging said aqueous hydrogen peroxide and anion-exchanging said aqueous hydrogen peroxide.

DETAILED DESCRIPTION OF THE INVENTION

In the present invention, a raw material aqueous hydrogen peroxide to be purified is usually a so-called technical aqueous hydrogen peroxide which is produced commercially. In general, a concentration of hydrogen peroxide in aqueous hydrogen peroxide is from 10 to 60% and its pH is from about 1.7 to 5.

In general, technical aqueous hydrogen peroxide contains the organic materials in a concentration of 30 to 600 ppm (w/w) in terms of organic carbon atoms: the metal-originated substances (e.g. metals as such, metal compounds, metal ions) such as those originated from iron, aluminum, sodium, calcium, lithium, zinc, lead, chromium, nickel, magnesium, etc. in a concentration of 20 to 10,000 ppb (w/w) in terms of simple substance metals; and phosphate radicals derived from, for example, a stabilizer in a concentration of several ppm to several ten ppm (w/w) into terms of phosphorus.

Figure 1:
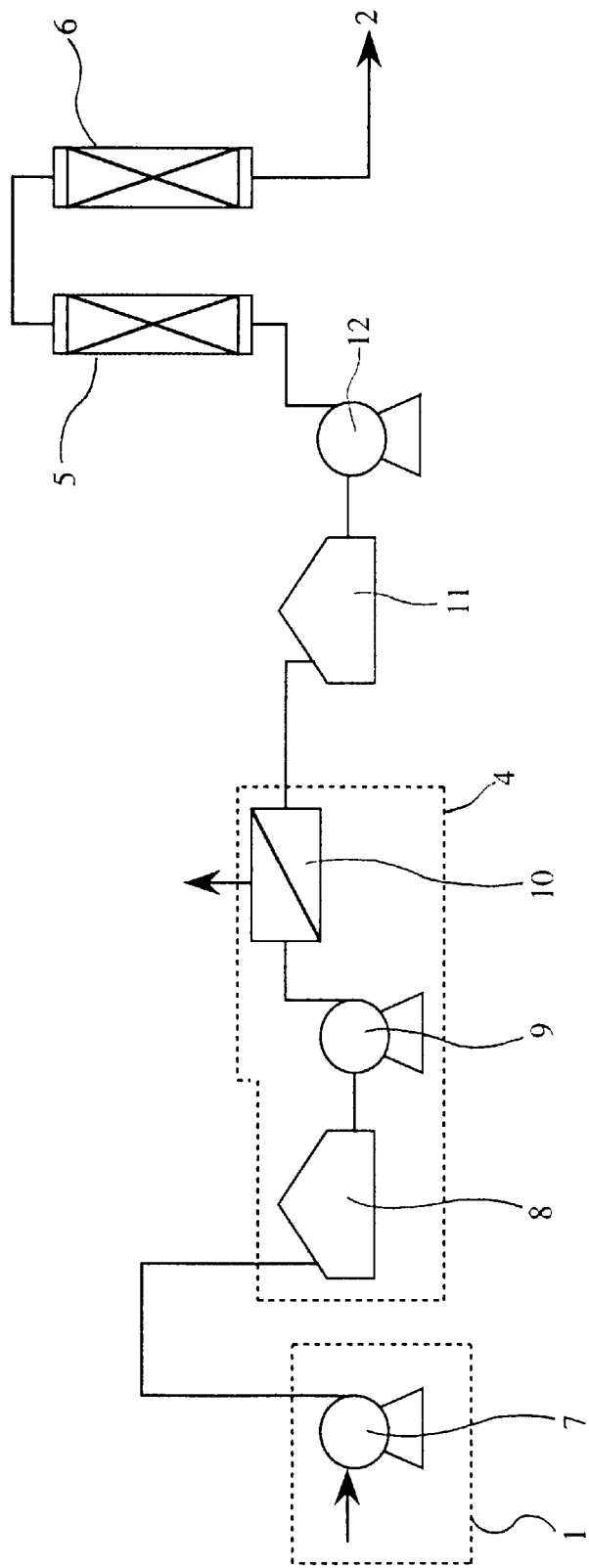
FIG. 1 schematically shows one embodiment of the apparatus of the present invention, and FIG. 2 schematically shows another embodiment of the apparatus of the present invention.
Figure 2:
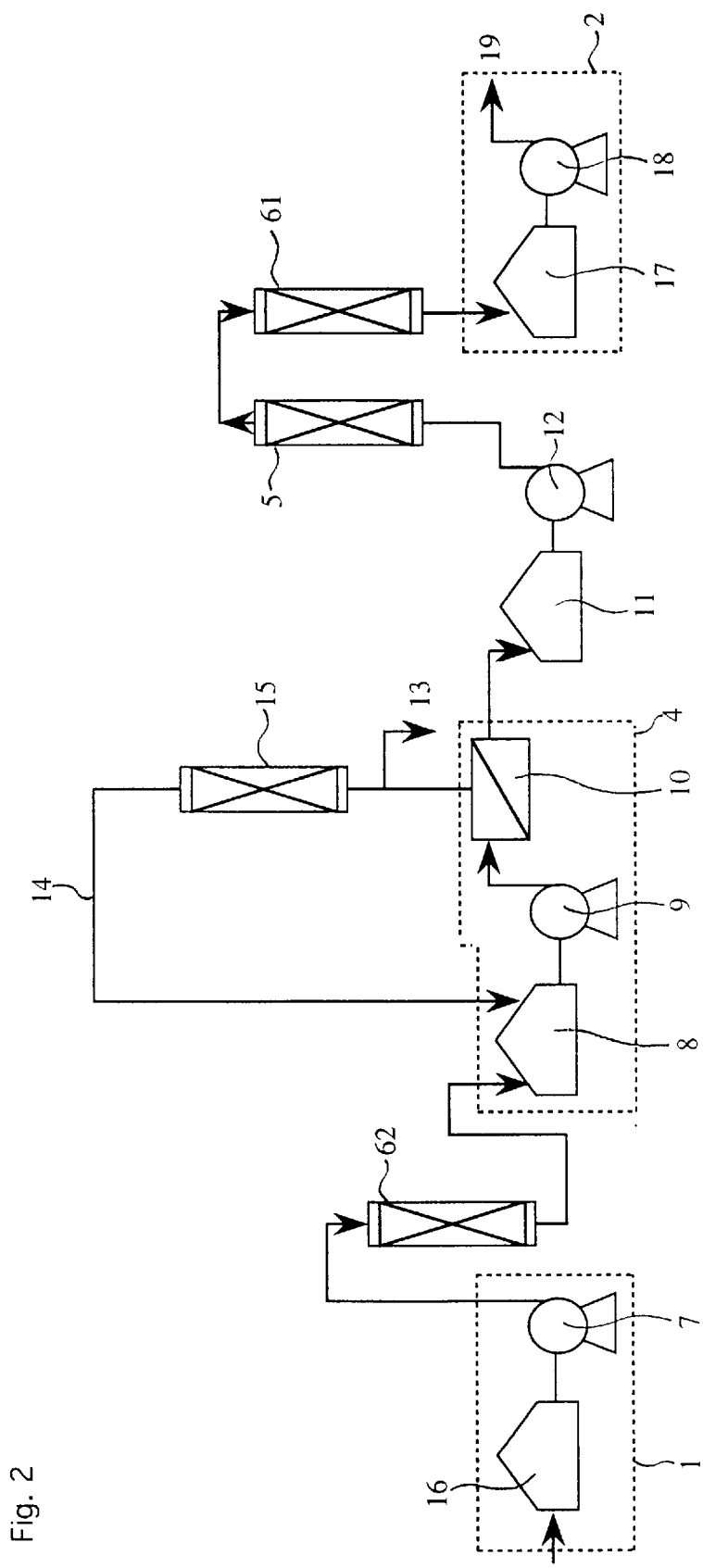

As shown in FIGS. 1 and 2, the apparatus of the present invention for removing the impurities from aqueous hydrogen peroxide comprising a section 1 for introducing aqueous hydrogen peroxide in a main line, a section 2 for discharging treated aqueous hydrogen peroxide from the main line, and the main line, which connects the liquid introducing section 1 and the liquid discharging section 2, comprises a section for reverse osmosis treatment 4, an anion-exchange equipment 5 and a cation-exchange equipment 6.

The liquid introducing section 1 supplies the raw material aqueous hydrogen peroxide in the main line and comprises a liquid transporting equipment 7 and optionally a reservoir tank 16 (FIG. 2). To the section 1, a pipe is connected for receiving the raw material aqueous hydrogen peroxide from an outside source. For example, when the raw material hydrogen peroxide from a hydrogen peroxide production facility is directly received through the pipe, a liquid transporting equipment such as a pump of such facility may be used as the liquid introducing section 1 of the present invention.

As the liquid transporting equipment 7, there may be used a pump such as a centrifugal pump, a diaphragm pump, and the like.

In the liquid transporting equipment 7, a part which contact the liquid is made of a material resistant to hydrogen peroxide, for example, passivated stainless steel, fluororesins such as polytetrafluoroethylene (PTFE), ceramics such as silicon carbide, and so on.

When the reservoir tank 16 is used, its parts which contact hydrogen peroxide such as an inner wall of the tank, an inner wall of a section for introducing the raw material hydrogen peroxide, and an inner wall of a section for discharging the raw material hydrogen peroxide are made of or coated with a material resistant to hydrogen peroxide such as fluororesins (e.g. PTFE, tetrafluoroethylene/perfluoroalkyl vinyl ether copolymer (PFA), tetrafluoroethylene/hexafluoropropylene copolymer (FEP), polyvinylidene fluoride (PVdF), etc.), polyethylene, and so on.

A capacity of the reservoir tank 16 is determined according to a volume of aqueous hydrogen peroxide to be introduced in the apparatus of the present invention. When the reservoir tank 16 is used, a pressurized reservoir tank may be used as the liquid transporting equipment in place of the pump.

The main line of the apparatus is provided between the liquid introducing section 1 and the liquid discharging section 2. The main line is also made of a material resistant to hydrogen peroxide. For example, the main line comprises a pipe made of a fluororesin such as PTFE. An inner diameter of the pipe constituting the main line is determined according to an amount of the aqueous hydrogen peroxide to be transported.

The liquid discharging section 2 is provided at the downstream end of the main line and discharges purified hydrogen peroxide from the apparatus of the present invention. This section 2 may optionally comprise a reservoir tank 17, liquid transporting equipment 18 such as a pump, an on-off valve, a pipe connecting them, and so on.

The section 4 for reverse osmosis treatment comprises a reverse osmosis treatment equipment 10. Optionally, this section 4 comprises a reservoir tank 8 and a liquid transporting equipment 9 such as a pump both on the upstream to the equipment 10 and pipes connecting them.

In the reservoir tank 8, a part contacting the liquid can be made of the same material as those exemplified in connection with the reservoir tank 16 of the liquid introducing section 1.

A capacity of the reservoir tank 8 depends on a volume of the liquid to be introduced, a treating capacity of the reverse osmosis treatment equipment 10, and so on.

As the liquid transporting equipment 9, there may be used a pump such as a centrifugal pump, a diaphragm pump, and the like. Alternatively, the reservoir tank may be pressurized by an inert gas such as nitrogen, helium, argon, etc.

In the reverse osmosis treatment equipment 10, the raw material aqueous hydrogen peroxide is passed from one side (a feed side, namely a liquid introduction side) to the other side (a permeate side, namely a liquid discharging side) which are separated by a reverse osmosis membrane, whereby a part of the impurities is removed.

As the reverse osmosis treatment equipment 10, various types may be used. For example, a flat type (a plate-and-frame type) which is separated by a single reverse osmosis membrane, a spiral module type in which the reverse osmosis membranes and spacers or nets are laminated and wound, and the like can be used.

As the reverse osmosis membrane, any reverse osmosis membrane can be used insofar as it is resistant to hydrogen peroxide and can remove the impurities. Examples of such reverse osmosis membrane are a composite membrane made of a polyamide such as an aromatic crosslinked polyamide, a composite membrane made of a polysulfone, a composite membrane made of a polyester, and the like. In particular, a composite membrane having a low pressure high trapping performance such as the composite membrane made of the aromatic crosslinked polyamide is preferred.

Other parts of the equipment 10 comprise the same components as those used in each type of the equipment. But, it is important that parts of the equipment 10 which contact hydrogen peroxide should be made of a material resistant to hydrogen peroxide. Examples of the hydrogen peroxide resistant material are polyethylene, polyproylene, polyphenylene oxide (e.g. Noryl, a trademark of General Electric), silicone rubbers, PTFE, and so on.

Since the feed side of the reverse osmosis treatment equipment 10 is pressurized, a pressure difference between the sides separated by the reverse osmosis membrane is maintained to 5 to 25 kg/cm$^2$. The pressure is applied to the feed side of the equipment 10 by the pump 9, or the reservoir tank pressurized by the inert gas such as nitrogen, helium or argon.

As a pipe which connects the parts of the reverse osmosis treatment equipment 10, a pipe made of the same material as that of the pipe of the main line can be used.

The ion-exchange equipment 5 and 6 remove the impurities by contacting aqueous hydrogen peroxide with ion-exchange resins. In the apparatus of the present invention, an ion-exchange equipment is used as a cation-exchange equipment 6 when a cation-exchange resin is used, while it is used as an anion-exchange equipment 5 when an anion-exchange resin is used. The structures of the cation-exchange equipment and the anion-exchange equipment are substantially the same except for the kinds of ion-exchange resins employed. Therefore, they are collectively explained as an ion-exchange equipment.

As the ion-exchange equipment 5 or 6, a packed column type one is generally used. In general, equipment which operates under atmospheric pressure is used.

A part of the packed column which contacts aqueous hydrogen peroxide is made of a material resistant to hydrogen peroxide such as PTFE, polyvinyl chloride, etc. In general, the packed column is used in an upright position. The raw material hydrogen peroxide may be flowed upward or downward. In the anion-exchange equipment 5, the up-flow is preferred.

Examples of the cation-exchange resin in the cation-exchange equipment 6 are strongly acidic cation-exchange reins such as a styrene base gel type resin, a styrene base macroporous type resin, and the like. Among them, the styrene base gel type strongly acidic cation-exchange resin is preferred.

Examples of the anion-exchange resin in the anion-exchange equipment 5 are weakly basic anion-exchange reins such as a styrene base macroporous type resin, strongly basic anion-exchange resins such as a styrene base gel type resin, a styrene base macroporous type resin, and the like. Among them, the styrene base gel type strongly basic anion-exchange resin is preferred.

Lengths and diameters of the ion-exchange equipments 5, 6, and amounts of the anion and cation-exchange resins are suitably selected according to an amount of the raw material aqueous hydrogen peroxide, concentrations of the impurities to be removed, and so on.

On the upstream side (the feed side) of each of the ion-exchange equipments 5, 6, it may be possible to provide a liquid-transporting equipment such as a pump 12 and a reservoir tank 11 additionally so as to supply aqueous hydrogen peroxide to the respective ion-exchange equipment. As the liquid-transporting equipment and the reservoir tank, the same equipment and tank as those explained in connection with the reverse osmosis treatment equipment can be used. Alternatively, the ion-exchange equipment is set at a level lower than the position of the pipe on the upstream side and the aqueous hydrogen peroxide is flowed in the ion-exchange equipment using the gravity.

The reverse osmosis treatment section 4, the cation-exchange equipment 6 and the anion-exchange equipment 5 should be connected in line via the pipes of the main line or directly. That is, a quantity of aqueous hydrogen peroxide which is introduced from the liquid introducing section 1 should pass the reverse osmosis treatment section 4, the cation-exchange equipment 6 and the anion-exchange equipment 5 before it is discharged from the liquid-discharging section. An order of the reverse osmosis treatment section 4, the cation-exchange equipment 6 and the anion-exchange equipment 5 is arbitrary. It is possible to provide two or more of the reverse osmosis treatment sections, the cation-exchange equipments and/or the anion-exchange equipments.

It may be possible to provide a chelate resin treating device which is not shown in the figures in the main line, in addition to the reverse osmosis treatment section 4, the cation-exchange equipment 6 and the anion-exchange equipment 5. A design of the chelate resin treating device may be the same as that of the cation-exchange equipment 6 or the anion-exchange equipment 5 except a kind of the resin. Examples of the chelate resin are aminophosphoric acid type chelate resins such as a styrene base gel type resin, acrylic aminocarboxylic acid base chelate resins, and the like. Among them, the styrene base gel type aminophosphoric acid chelate resin is preferred.

In the apparatus of the present invention, it is possible to provide a recycling line 14 and a transition metal scavenging equipment 15 in the recycling line 14 so as to recycle a part of aqueous hydrogen peroxide from the feed side of the reverse osmosis treatment equipment 10 to the reservoir tank 8 in the reverse osmosis treatment section 4.

The recycling line 14 and the transition metal scavenging equipment 15 in the recycling line 14 are preferably provided to reuse a part of aqueous hydrogen peroxide in which the impurities are concentrated in the feed side part of the parts separated by the reverse osmosis membrane in the reverse osmosis treatment equipment 10 by recycling said part to the reservoir tank 8 in the reverse osmosis treatment section 4. In particular, the provision of the transition metal scavenging equipment 15 in the recycling line 14 enables the recycling of aqueous hydrogen peroxide while removing the transition metals such as iron, titanium, platinum, etc. which are the causes for decomposition of hydrogen peroxide.

It is industrially preferred to provide the recycling line 14 and the transition metal scavenging equipment 15 in the line 14 in view of the effective use of the raw material, the quality of the produced pure aqueous hydrogen peroxide, and the safety of the apparatus, and the like.

A material of the recycling line 14 may be the same as that of the pipe constituting the main line. An inner diameter of the recycling line 14 is selected according to other conditions.

The transition metal scavenging equipment 15 is provided in the recycling line 14 and removes the transition metals by contacting the recycled aqueous hydrogen peroxide to a cation-exchange resin, an anion-exchange resin or a chelate resin. As the transition metal scavenging equipment 15, in general, a packed column type one is used industrially.

A part of the packed column which contacts aqueous hydrogen peroxide is made of a hydrogen peroxide resistant material, for example, PTFE, polyvinyl chloride, and so on.

Examples of the cation-exchange resin are strongly acidic cation-exchange reins such as a styrene base gel type resin, a styrene base macroporous type resin, acrylic acid base weakly acidic ion-exchange resins, and the like. Among them, the styrene base gel type strongly acidic cation-exchange resin is preferred.

Examples of the anion-exchange resin are weakly basic anion-exchange reins such as a styrene base macroporous type resin, strongly basic anion-exchange resins such as a styrene base gel type resin, a styrene base macroporous type resin, and the like. Among them, the styrene base gel type strongly basic anion-exchange resin is preferred.

Examples of the chelate resin are aminophosphoric acid type chelate resins such as a styrene base gel type resin, acrylic aminocarboxylic acid base chelate resins, and the like. Among them, the styrene base gel type aminophosphoric acid chelate resin is preferred.

These resins may be used independently or as a combination of two or more of them. When they are used in combination, each of them is packed in the respective column and two or more columns are provided in the recycling line 14 in line, or they are mixed and packed in a single column. Preferably, a combination of the cation-exchange resin and the chelate resin is used.

Further, it is possible to provide an outlet 13 for discharging a part of the recycled aqueous hydrogen peroxide from the recycling line 14.

In some cases, to prevent the accumulation of the impurities in aqueous hydrogen peroxide in the reverse osmosis treatment equipment 10, it may be possible to provide an outlet in the feed side of the reverse osmosis treatment equipment 10 so as to discharge a part of aqueous hydrogen peroxide, whereby said part of aqueous hydrogen peroxide is discharged outside the apparatus, while the rest of aqueous hydrogen peroxide is passed through the reverse osmosis membrane.

In the treating method of the present invention, the raw material aqueous hydrogen peroxide is subjected to the reverse osmosis treatment, the cation-exchange treatment and the anion-exchange treatment to remove the impurities from aqueous hydrogen peroxide.

The reverse osmosis treatment is carried out using the above explained reverse osmosis treatment equipment 10 at a pressure difference of 5 to 25 kg/cm$^2$, preferably 10 to 20 kg/cm$^2$ between the sides of the reverse osmosis membrane.

A flow rate of the aqueous hydrogen peroxide which passes through the reverse osmosis membrane is usually from 10 to 40 l/m$^2$.hr.

A treating temperature in the reverse osmosis treatment is usually from −20 to +35° C., preferably from +5 to +30° C.

In general, the cation-exchange treatment is carried out using the above explained cation-exchange equipment 6 usually under atmospheric pressure. An amount of the cation-exchange resin, a length and diameter of the column, a flow rate of aqueous hydrogen peroxide can be determined according to the amounts of the impurities to be removed.

The treating temperature in the cation-exchange treatment is usually from −20 to +35° C., preferably from +2 to +15° C.

In general, the anion-exchange treatment is carried out using the above explained anion-exchange equipment 5 usually under atmospheric pressure. An amount of the anion-exchange resin, a length and diameter of the column, a flow rate of aqueous hydrogen peroxide can be determined according to the amounts of the impurities to be removed.

The treating temperature in the cation-exchange treatment is usually from −20 to +35° C., preferably from +2 to +15° C.

An order of the reverse osmosis treatment, the cation-exchange treatment and the anion-exchange treatment is arbitrary, and the number of each treatment is also arbitrary.

By the treatment of the present invention, a total amount of the organic carbons in the treated aqueous hydrogen peroxide is reduced to 10 ppm (w/w) or less, and the content of each metal therein is reduced to 10 ppt or less, preferably 5 ppt or less. An amount of phosphorus therein can be reduced to less than the limit of detection, namely 70 ppt by ICP-MS method.

In addition to the above essential treatments, the raw material aqueous hydrogen peroxide may be treated with the chelate resin. The treatment with the chelate resin may be carried out at any stage in the method of the present invention.

The chelate resin treatment is carried out using the above explained chelate resin treating equipment under atmospheric pressure. An amount of the chelate resin, a length and diameter of the column, a flow rate of aqueous hydrogen peroxide can be determined according to the amounts of the impurities to be removed.

The treating temperature in the cation-exchange treatment is usually from −20 to +35° C., preferably from +2 to +15° C.

In the reverse osmosis treatment, a part of aqueous hydrogen peroxide which has not been passed through the reverse osmosis membrane may be recycled to the reservoir tank 8 of the reverses osmosis treatment section 4 after the transition metal scavenging, whereby the accumulation of the transition metals which cause the decomposition of hydrogen peroxide, in particular, iron can be suppressed. Such recycling of aqueous hydrogen peroxide is advantageous and preferred in view of the effective utilization of the raw material, the quality of the produced hydrogen peroxide, and the safety of the method.

A volume ratio of the part of aqueous hydrogen peroxide to be recycled to the rest of aqueous hydrogen peroxide which is passed through the reverse osmosis membrane is usually from 1:1 to 50:1. That is, the reverse osmosis treating ratio is from 1:50 to 1:1.

The transition metals are scavenged by the above explained transition metal scavenging equipment 15. A flow rate of aqueous hydrogen peroxide therethrough depends on the amount of aqueous hydrogen peroxide to be recycled. An amount of the anion-exchange resin, the cation-exchange resin or the chelate resin, a length and diameter of the column, a treating time can be determined according to the amounts of the impurities to be removed.

The treating temperature in the cation-exchange treatment is usually from −20 to +35° C., preferably from +2 to +15° C.

When the recycling treatment is carried out for a long time, organic materials or other materials are accumulated in aqueous hydrogen peroxide. Then, it is preferred to discharge a part of aqueous hydrogen peroxide to be recycled from the outlet 13 provided in the recycling line 14 at intervals or continuously. By the above treatment of aqueous hydrogen peroxide, the concentration of the transition metals in the recycled aqueous hydrogen peroxide can be suppressed to 80 ppb or less, preferably 10 ppb or less.

According to the apparatus, and method for removing the impurities from aqueous hydrogen peroxide of the present invention, the impurities originated from the metals or the organic materials, or other impurities can be effectively removed, and the levels of the total organic carbon content and the metal content are decreased to 10 ppm or less and 10 ppt or less, respectively, which low levels cannot be attained by the conventional apparatus or method. Aqueous hydrogen peroxide from which the impurities are highly removed is quite useful as an chemical in the electronics industry.

PREFERRED EMBODIMENTS OF THE INVENTION

The present invention will be illustrated further in detail by the following examples.

EXAMPLE

Using the apparatus shown in FIG. 2, a quantity of aqueous hydrogen peroxide was subjected to the continuous impurity removing experiment at a stationary state for 300 hours.

A raw material hydrogen peroxide (Analytical data are shown in Table 1) was pumped up from the reservoir tank 16 (capacity: 200 liters) in the liquid introducing section 1 with the pump 7 (a diaphragm pump, liquid contacting parts of which were made of PTFE) and flowed through the cation-exchange equipment 62 (a column having an inner diameter of 76 mm and a length of 1.5 m which was packed with 7.5 l of a styrene base gel type strongly acidic ion-exchange resin, an inner wall of the column: polyvinyl chloride) at a flow rate of 18 to 40 l/hr to effect cation-exchange. Then, aqueous hydrogen peroxide was passed to the reservoir tank 8 (capacity: 1000 liters).

The aqueous hydrogen peroxide in the reservoir tank 8 was supplied to the reverse osmosis treatment equipment 10 (a reverse osmosis membrane: polyamide membrane, a membrane area: 0.6 $m^2$, parts contacting the liquid except the membrane: passivated stainless steel) by the pump 9 (a high pressure centrifugal pump, liquid contacting parts of which were made of stainless steel) at a flow rate of 100 to 670 l/hr. In the equipment 10, the reverse osmosis treatment was carried out by adjusting the pressure difference between the sides of the membrane at 14 to 15 $kg/cm^2$ so that a membrane passing rate was 10 to 20 l/hr and a recycled amount via the recycling line 14 was 90 to 650 l/hr.

A part of aqueous hydrogen peroxide recycled via the line 14 was passed through the transition metal scavenging equipment 15 (a column having an inner diameter of 152 mm and a length of 1.5 m which was packed with a mixture of 4.5 l of a styrene base gel type strongly acidic ion-exchange resin and 4.5 l of a styrene base gel type amino-phosphoric acid chelate resin, an inner wall of the column: polyvinyl chloride) to scavenge the transition metals and recycled to the reservoir tank 8.

The rest of aqueous hydrogen peroxide which passed through the reverse osmosis membrane was transferred to the reservoir tank 11. The aqueous hydrogen peroxide in the tank 11 was pumped up with the pump 12 (a diaphragm pump, liquid contacting parts of which were made of PTFE) to the anion-exchange equipment 5 (a column having an inner diameter of 51 mm and a length of 1.2 m which was packed with 4.5 l of a styrene base gel type weakly basic ion-exchange resin, an inner wall of the column: PTFE) and the cation-exchange equipment 61 (a column having an inner diameter of 51 mm and a length of 1.2 m which is packed with 3 l of a styrene base gel type strongly acidic ion-exchange resin, an inner wall of the column: PTFE) at a flow rate of 14 to 18 l/hr to effect cation and anion-exchange treatments. Then, the aqueous hydrogen peroxide was passed to the reservoir tank 17.

The aqueous hydrogen peroxide in the tank 17 was discharged with the pump 18 (a diaphragm pump liquid contacting parts of which are made of PTFE) through the outlet 19 at a flow rate of 14 to 18 l/hr.

A small amount of the aqueous hydrogen peroxide from the outlet 19 was sampled and analyzed.

Results are shown in Table 1. These analytical data were averaged data of the 300 hour experiment at the stationary state.

In this experiment, the materials of the inner walls of the reservoir tanks were polyethylene. The materials of the pipes of the main line, the recycling line and other pipes were PTFE except that the pipe between the reservoir tank 8 and the reverse osmosis treatment equipment 10 was a PTFE lined steel pipe.

An inner diameter of each pipe was 0.5 inch except that the pipe between the reservoir tank 8 and the reverse osmosis treatment equipment 10 had the inner diameter of 1 inch.

TABLE 1

| Analytical items | Lower limit of defection | Hydrogen peroxide | |
|---|---|---|---|
| | | Raw Material | After Treatment (obtained at the outlet 19) |
| $H_2O_2$ (%) | — | 31 | 31 |
| Fe (ppt) | 5 | 30,000 | 7 |
| Al (ppt) | 5 | 200,000 | 6 |
| Na (ppt) | 5 | 10,000,000 | 9 |
| Ca (ppt) | 5 | 2,300 | 8 |
| Mg (ppt) | 5 | 11,000 | <5 |
| Cu (ppt) | 5 | 700 | <5 |
| Cr (ppt) | 5 | 7,300 | 7 |
| P (ppt) | 70 | 11,000,000 | <70 |
| TOC* (ppm) | 1 | 45 | 7 |
| pH | — | 2.8–3.0 | 3.6–3.7 |

TOC: Total Organic Carbon
Analytical method
$H_2O_2$: Permanganate Titration Method
Fe and Ca: Flameless Atomic Absorption Spectroscopy Method
Al, Na, Mg, Cu, Cr and P: ICP-MS Method
TOC: NDIR Gas Analysis

COMPARATIVE EXAMPLE

In the same manner as in the Example except that the aqueous hydrogen peroxide was not passed through the reverse osmosis treatment equipment 10 or not recycled to effect the transition metal scavenging, the raw material aqueous hydrogen peroxide was treated.

In the aqueous hydrogen peroxide treated in the Comparative Example, the amount of the total organic carbons was 45 ppm, the concentrations of Fe, Al and P were 100 ppt, 100 ppt and 200 ppt, respectively. The concentration of hydrogen peroxide was 31%, and pH was 3.6 to 3.7. These values were averaged values of the 30 hour experiment at the stationary state.

What is claimed is:

1. An apparatus for removing impurities from aqueous hydrogen peroxide, comprising:
   a source of aqueous hydrogen peroxide;
   a means for introducing aqueous hydrogen peroxide from said source into a main line,
   said main line comprising a means for reverse osmosis treatment, a means for cation-exchange treatment and a means for anion-exchange treatment, and
   a means for discharging treated aqueous hydrogen peroxide from said main line; wherein said means for reverse osmosis treatment comprises a reverse osmosis treatment equipment, a reservoir tank and a liquid transporting equipment, said tank and liquid transporting equipment being provided on an upstream side of said reverse osmosis treatment equipment; and
   which further comprises a recycling line from a feed side of said reverse osmosis treatment equipment to said reservoir tank, and a transition metal scavenging equipment in said recycling line.

2. The apparatus according to claim 1, wherein said means for reverse osmosis treatment comprises a reverse osmosis treatment equipment having a composite membrane of an aromatic crosslinked polyamide.

3. The apparatus according to claim 1, wherein said cation-exchange means for treatment comprises a styrene base gel type strongly acidic ion-exchange resin.

4. The apparatus according to claim 1, wherein said anion-exchange treatment comprises a styrene base gel type strongly basic ion-exchange resin.

5. The apparatus according to claim 1, wherein said transition metal scavenging equipment comprising at least one resin selected from the group consisting of cation-exchange resins, anion-exchange resins and chelate resins.

6. The apparatus according to claim 1, wherein said means for introducing aqueous hydrogen peroxide comprises a reservoir tank and means for transporting liquid from said reservoir to said main line.

7. The apparatus according to claim 1, wherein all parts of said main line that contact the liquid are made of a material resistant to hydrogen peroxide.

8. The apparatus according to claim 7, wherein all parts of said main line that contact the liquid are made of polytetrafluoroethylene.

9. An apparatus for removing impurities from aqueous hydrogen peroxide, comprising in an upstream to downstream order:
   a reservoir tank containing aqueous hydrogen peroxide;
   a means for transporting aqueous hydrogen peroxide from said reservoir tank into a main line;
   said main line comprising a first means for cation-exchange treatment of impure aqueous hydrogen peroxide, a means for reverse osmosis treatment of impure aqueous hydrogen peroxide, a means for anion-exchange treatment of impure aqueous hydrogen peroxide and a second means for cationic-exchange treatment of impure aqueous hydrogen peroxide;
   a means for discharging treated aqueous hydrogen peroxide from said main line; and
   said apparatus further comprising a recycling line from a feed side of said reverse osmosis treatment equipment to said reservoir tank, and a transition metal scavenging equipment in said recycling line;
   wherein said means for reverse osmosis treatment comprises a reverse osmosis treatment equipment, a reservoir tank and a liquid transporting equipment, said tank and liquid transporting equipment being provided on an upstream side of said reverse osmosis treatment equipment.

* * * * *